May 15, 1934.   P. DODGE   1,958,511
SLACK TAKE-UP AND FORCE MULTIPLIER FOR HYDRAULIC BRAKES
Filed Jan. 9, 1933   2 Sheets-Sheet 2
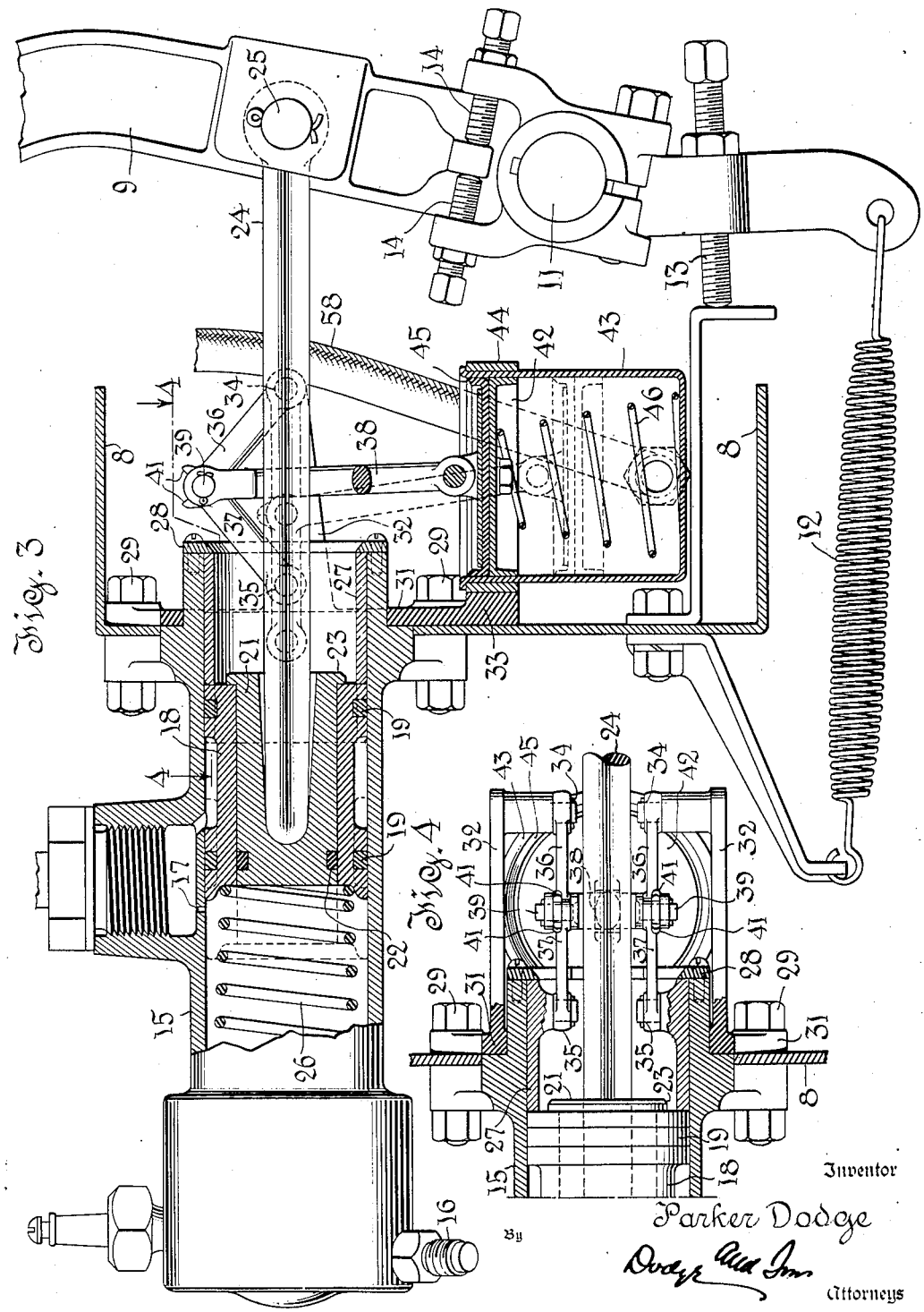
Inventor
Parker Dodge
By
Dodge and Son
Attorneys Patented May 15, 1934

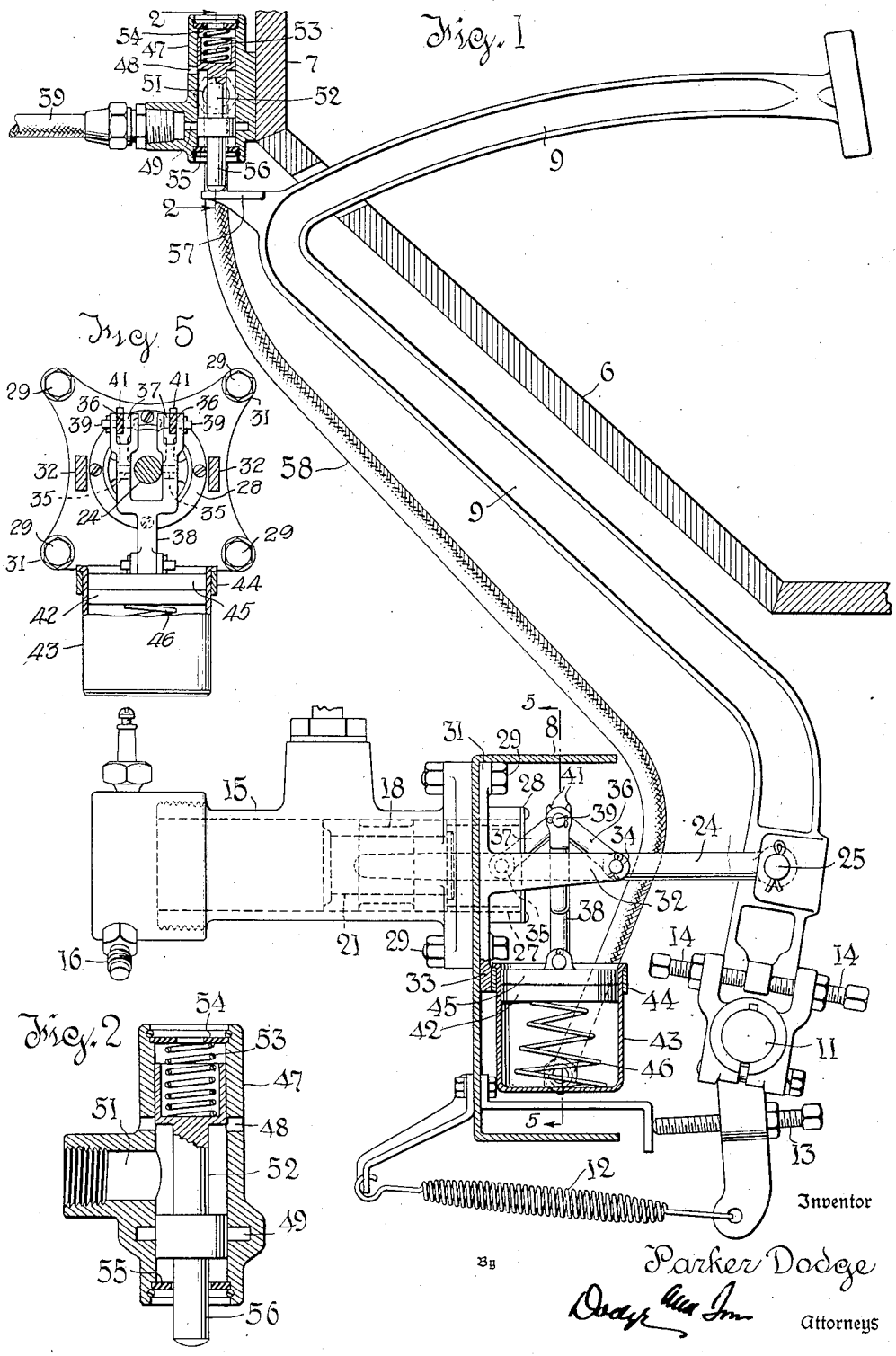

1,958,511

UNITED STATES PATENT OFFICE 1,958,511

SLACK TAKE-UP AND FORCE MULTIPLIER FOR HYDRAULIC BRAKES

Parker Dodge, Chevy Chase, Md., assignor to The New York Air Brake Company, a corporation of New Jersey Application January 9, 1933, Serial No. 650,909

9 Claims. (Cl. 188—152)

This invention relates to devices for taking up the slack and increasing the force ratio in hydraulic force transmitters and particularly in hydraulic brakes.

In connection with mechanical brakes operated by a foot pedal, it has been proposed to use a motor rendered active by the initial motion of the foot pedal to take up the slack in the brake rigging (bringing the brakes to the point of application) and simultaneously to increase the force ratio between the pedal and the brakes. This last becomes feasible because the elimination of the slack travel permits the longer operating travel of the foot pedal necessarily incident to the increased force ratio. It was characteristic of the prior art device that if the slack take-up motor should fail to operate, the brake pedal would apply the brakes with the normal (lower) force ratio and corresponding shortened pedal travel.

The object of the present invention is to attain these same operative characteristics in a hydraulic, as contradistinguished from a mechanical brake system, and to do so by simple modifications of and additions to commercial hydraulic systems.

The preferred embodiment of the inevention is illustrated in the accompanying drawings, in which:—

Fig. 1 is a view partly in side elevation and partly in section showing the brake pedal and oil displacing master cylinder of a commercial hydraulic automotive brake with the invention applied.

Fig. 2 is a section of the control valve, the plane of section being on the line 2—2 of Fig. 1.

Fig. 3 is an enlarged view chiefly in vertical axial section showing the master cylinder and related parts.

Fig. 4 is a fragmentary view chiefly in section on the line 4—4 of Fig. 3.

Fig. 5 is a section on the line 5—5 of Fig. 1.

Referring first to Fig. 1, the footboard of an automobile is indicated at 6, a bulkhead at 7 and a chassis cross-member at 8. The usual brake pedal appears at 9 and is fulcrumed at 11. It is drawn to a normal, brake releasing position, by a coil tension spring 12. An adjustable stop screw 13 permits adjustment of tension while the screws 14 permit a compensating adjusting of the position of the pedal 99.

Mounted on member 8 is the master cylinder 15 of the hydraulic brake system, the cylinder being provided with a plurality of connections 16, as usual, to which are connected tubes (not shown) leading to the brake cylinders (not shown) on the various road wheels of the automobile. Only one of the connections 16 is visible in Fig. 3, but the use of a plurality is standard practice and will be readily understood. The cylinder 15 has the usual oil supply port 17 to make up leakage, and when equipped with a simple piston actuated by a thrust rod connected to pedal 9, conforms in general to known practice.

To apply the present invention to a system of this type a duplex piston is substituted for the usual piston. The duplex piston comprises a sleeve 18 having packing rings 19 and a second piston 21 having a packing ring 22. The sleeve 18 works in cylinder 15 while the piston 21 is slidable in sleeve 18. Its inward motion is limited with respect to sleeve 18 by a flange 23, and it is provided with a socket to receive and retain the end of a thrust rod 24 pinned at 25 to pedal 9.

The coil compression spring 26 reacts against sleeve 18 and thus serves to urge piston 21 and pedal 9 as well as sleeve 18 in a brake releasing direction. Outward motion of sleeve 18 is limited by an abutting sleeve 27 which is limited in its outward motion by stop ring 28 attached to the end of cylinder 15.

Encircling the end of cylinder 15 and attached to member 8 by the same bolts 29 which hold the cylinder 15 is a yoke 31. This is formed with two horizontal arms 32 and a pendant lug 33. Pivoted at 34 to the arms 32 and at 35 to sleeve 27, respectively, are the component links 36 and 37 of two toggles. The links 36 and 37 of each strut are hinged together and to the forked connecting rod 38 at 39, so that when the rod 38 is drawn downward the toggles straighten and force sleeve 27 and consequently sleeve 18 inward. Lugs 41 on the links 36 and 37 limit such motion.

The travel of sleeve 18 and its area are so coordinated with the slack in the system that the brakes will be substantially at the point of application when sleeve 18 has traveled fully inward while piston 21 remains substantially at rest.

The rod 38 is connected to the piston 42 of a motor which might take various forms, but is here indicated as a "suction" motor. Consequently piston 42 works in a cylinder 43 open at its upper end, and carried by a ring 44 on lug 33. A cup leather 45 seals the piston in its cylinder and a coil compression spring 46 urges the piston to its normal, upper, position.

To control piston 42 use is made of a balanced piston valve of the inside cut-off type, actuated by pedal 9 in a short range of motion of the pedal in brake-off position.

The body of this valve is shown at 47 and is supported on bulkhead 7. As best shown in Fig. 2 the body 47 is bored through from end to end and has atmospheric ports 48 and a sub-atmospheric port 49, either of which is connected selectively to motor port 51 when bridged by the middle, reduced portion of piston valve 52. When either of ports 48 or 49 is connected to port 51 the other port is blanked by one of the heads in the valve.

The valve 52 is urged downward by coil compression spring 53 which reacts against removable ported head 54. Its downward motion is limited by removable head 55, through an opening in which the stem 56 of the valve works. When pedal 9 is in brake releasing position a lug 57 on the pedal engages stem 56 and forces valve 52 to its upper position (see Figs. 1 and 2). Slight depression of the pedal 9 frees valve 52 so that it moves to its lowest position. Port 51 is connected by tube 58 with cylinder 43, and port 49 is connected by tube 59 to any space maintained at a pressure substantially below atmospheric pressure (for example, the intake manifold of a gasoline engine).

When pedal 9 is in its normal position valve 52 connects ports 48 and 51 and port 49 is blanked. Piston 42 is subject to atmospheric pressure on both sides and spring 46 holds it in its upper position, retracting sleeve 27.

When pedal 9 is slightly depressed valve 52 shifts to connect ports 49 and 51 and blank port 48, thus establishing subatmospheric pressure beneath piston 42. The piston moves downward, straightens the toggles, and thus forces sleeves 27 and 18 inward, taking up the slack. Thereafter depression of pedal 9 moves only the small piston 21, which establishes a high force ratio between pedal 9 and the brakes. Thus heavy applications can be made by the exertion of slight force on the pedal.

When pedal 9 is released after an application, it is free to rise independently of piston 21, and thus returns rapidly to its normal release position in which it shifts valve 52 and deenergizes piston 42. Consequently piston 18 is freed to move outward and spring 26 becomes effective to move both pistons.

Should the motor piston 42 fail to function the flange 23 on piston 21 would engage sleeve 18 and ensure inward motion of sleeve 18 with piston 21. This would, of course, establish only the normal low force ratio between the pedal and brake. Under such conditions the ratio would be the same as now secured in hydraulic brakes. It should be observed that sleeve 18 moves independently of sleeve 27 under these conditions so that the motor offers no resistance to the functioning of the device.

While I have disclosed a suction operated motor, any controllable motor might be used, whether pressure actuated or other. A simple reorganization would permit the use of a fluid pressure motor operating above atmospheric pressure. The use of an irreversible mechanism, such as a toggle, permits the use of a small motor to shift sleeve 18, because the irreversible mechanism protects the motor from the final heavy braking pressure.

What is claimed is,—

1. A slack take-up and force-ratio multiplier for hydraulic brakes and the like, comprising in combination, a displacing piston for taking up slack; a displacing piston for exerting braking force; power means for actuating the first piston; manually actuated means for actuating the second piston; controlling means for said power means arranged to be operated upon initial motion of said manually actuated means in a force-developing direction; and connections whereby said manually actuated means will also actuate the first piston should said power means fail to function.

2. A slack take-up and force-ratio multiplier for hydraulic brakes and the like, comprising in combination, a displacing piston for taking up slack; a displacing piston for exerting braking force; power means for actuating the first piston; manually actuated means for actuating the second piston; controlling means for said power means arranged to be operated upon initial motion of said manually actuated means in a force-developing direction; and connections between said pistons whereby motion of the second entails motion of the first, should said power means fail to function.

3. The combination of claim 2, further characterized in that one of said pistons is arranged for limited sliding movement in the other.

4. The combination of claim 2, further characterized in that the second of said pistons is arranged for limited sliding movement in the first.

5. A slack take-up and force ratio multiplier for hydraulic brakes and the like, comprising in combination, a displacing piston for taking up slack; a displacing piston for exerting braking force, said pistons being in such one-way thrust relation with each other that motion of the second in a displacing direction entails motion of the first in a displacing direction; power actuating means in one-way thrust relation with the first piston and capable of moving it in displacing direction; manual actuating means for the second piston; and a controller for said power means arranged to be shifted upon initial motion of said manual means in a displacing direction.

6. The combination of claim 5, further characterized in that one of said pistons is arranged for limited sliding motion in the other.

7. The combination of claim 5, further characterized in that the operating connection between the first piston and its power actuating means is arranged to lock against retrograde motion of the piston at the limit of its displacing motion and thus protect the power means from braking stress.

8. A slack take-up and force-ratio multiplier for hydraulic brakes and the like, comprising in combination, a displacing piston for taking up the slack; a displacing piston for exerting braking force, one of said pistons being annular and the other working in the bore thereof, the two pistons being in one way thrust relation such that motion of the second named piston in a displacing direction entails similar motion of the first named piston; power actuating means; a toggle linkage arranged to be actuated by said power means and when actuated to enter into thrust relation with the first named piston and move it in displacing direction; manual actuating means for the second named piston; and a controller for said power actuating means, arranged to be shifted by initial motion of said manual actuating means in a displacing direction.

9. The combination of claim 8, further characterized in that said power actuating means is an expansible chamber motor and said controller is a distributing valve.

PARKER DODGE.

DISCLAIMER 1,958,511.—*Parker Dodge*, Chevy Chase, Md. SLACK TAKE-UP AND FORCE MULTI-
PLIER FOR HYDRAULIC BRAKES. Patent dated May 15, 1934. Disclaimer
filed October 29, 1936, by the assignee, *The New York Air Brake Company*.
Hereby enters this disclaimer to claims 1 to 6, inclusive, of said patent.
[*Official Gazette November 24, 1936*]